US006889007B1

(12) United States Patent
Wang et al.

(10) Patent No.: US 6,889,007 B1
(45) Date of Patent: May 3, 2005

(54) WAVELENGTH ACCESS SERVER (WAS) ARCHITECTURE

(75) Inventors: Guo-Qiang Q. Wang, Nepean (CA); Kent E. Felske, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 674 days.

(21) Appl. No.: 09/605,824

(22) Filed: Jun. 29, 2000

(51) Int. Cl.[7] .............................................. H04J 14/02
(52) U.S. Cl. ........................ 398/79; 398/74; 398/75; 398/45; 398/48; 398/49; 398/50; 398/51; 398/54; 398/56; 398/57; 398/58; 398/91; 370/354; 370/395.1; 370/430; 370/435; 725/81
(58) Field of Search ............................ 398/79, 45, 48, 398/49, 50, 51, 54, 56, 57, 58, 75, 74, 91; 370/354, 395.1, 430, 535; 725/81

(56) References Cited

U.S. PATENT DOCUMENTS

| | | | | |
|---|---|---|---|---|
| 5,825,949 A | | 10/1998 | Choy et al. ................... 385/24 |
| 5,880,864 A | * | 3/1999 | Williams et al. ............ 359/124 |
| 5,896,211 A | * | 4/1999 | Watanabe ..................... 398/76 |
| 6,128,666 A | * | 10/2000 | Muller et al. ................ 709/238 |
| 6,253,207 B1 | * | 6/2001 | Malek et al. ................ 707/104 |
| 6,362,908 B1 | * | 3/2002 | Kimbrough et al. ........ 398/164 |
| 6,525,850 B1 | * | 2/2003 | Chang et al. ................ 359/124 |
| 6,535,313 B1 | * | 3/2003 | Fatehi et al. ................ 398/101 |
| 6,597,689 B1 | * | 7/2003 | Chiu et al. ................... 370/354 |

OTHER PUBLICATIONS

Brent Allen and James Rouse, "Optical Transport Networks– Evolution, Not Revolution," Nortel Networks, OPTera Metro Solutions, Kanata, Canada, pp. 1–7.
Elaine Bird and Solomon Wong, "Local Network DWDM Management," 1998, Nortel Networks, OPTera Solutions, Kanata, Canada, pp. 1–5.

\* cited by examiner

Primary Examiner—Hanh Phan

(57) ABSTRACT

A wavelength access server (WAS) architecture provides aggregation of traffic streams of diverse data communication protocols as well as provision of wavelength resources in an optical transport network. The WAS provides functions such as service traffic adaptation, traffic aggregation and segmentation, traffic classification, optical inter-working and system management. In particular, system management includes aspects such as signaling, connection management, resource co-ordination, protection prioritization and access policy management.

8 Claims, 3 Drawing Sheets

WAVELENGTH ACCESS SERVER (WAS) ARCHITECTURE

FIELD OF THE INVENTION

The present invention relates to communication between optical transport networks and service networks, more particularly, the present invention relates to a wavelength access server (WAS) architecture.

BACKGROUND OF THE INVENTION

In networking for data communication, different protocols are used to communicate for different purposes. In other words, networks using different data communication protocols are used to provide users of these networks with different services. A service network using a particular data communication protocol may be chosen for an ability of the protocol to optimize a particular parameter such as cost, delay or bandwidth. The Internet Protocol (IP) is one of the best known of these data communication protocols. Other data communication protocols include Asynchronous Transfer Mode (ATM), Synchronous Optical Network (SONET), Synchronous Digital Hierarchy (SDH), Gigabit Ethernet, Fiber-Distributed Data Interface (FDDI) and Enterprise Systems Connection (ESCON).

Often, service networks that are separated geographically communicate over transport networks. Increasing need for capacity in transport networks is, to a large extent, being met by communication links over which communication is accomplished by modulating an optical signal, such as a beam of light, to represent binary coded data. To make efficient use of an optical medium (such as glass fiber), many unique data signals may be transmitted over the same optical medium so long as each data signal modulates an optical signal with a wavelength different from the other optical signals on the same medium. When the wavelengths of the different optical signals are only marginally different from one another, the transmission scheme may be called Dense Wavelength Division Multiplexing (DWDM). In a networking using DWDM, two elements connected by a single physical link (optical fiber) may communicate using a number of optical signals, each with a distinct wavelength. Each optical signal may be called a wavelength channel and have qualities normally associated with a entire link between elements, such as bandwidth and delay.

Advances in the area of optical transport networks have resulted in optical transport network-specific protocols for use to establish, reconfigure and dynamically provision resources within an optical transport network (See "Scaling Optical Data Networks with Wavelength Routing—A White Paper," Monterey Networks, 1999, hereby incorporated herein by reference).

Although provision, or "access control," of resources in a transport network can be dynamic from the perspective of a element of the transport network, current access control of resources in a transport network from the perspective of a service network node (such as an ATM switch) is essentially static. At best, service network node access control can take the form of a point-and-click operation whereby a network management node controls both a service network node and a transport network element. At worst, the access control can be a slow and painstaking operation that requires redesigning a portion of the optical transport network.

A service network node designated for connection to optical transport network equipment may be termed transport access customer premise equipment (CPE). Due to distance limitations of connections between a transport access CPE and an optical transport network element, there is a requirement for the transport access CPE to be co-located with the optical transport network element. Often, the optical transport network element is chosen for functions specific to the service of the service network node as well as transport network specific functions. A change in the protocol of the service network may therefore require a change of the transport network element. Further, improvements to the connection of the transport network element to the rest of the optical transport network, for instance, provision of additional wavelength channels, may require an update to the static access control.

Even if a service network node could be provided with a capability to dynamically provision resources in an optical transport network, it may be costly or inconvenient to update the operational capability of transport access CPE. Further, as in the case of a service provider, there may be a requirement to grant transport network access to more than one service network, where the service networks use a variety of data communication protocols.

SUMMARY OF THE INVENTION

According to the present invention, access control is removed from the function list of optical transport network equipment and given to a wavelength access server. The data communication protocol in use by a transport access CPE is then transparent to the transport network element. Further, resources within the optical transport network may be provisioned dynamically by the wavelength access server. Advantageously, the wavelength access server may support transmission from a variety of transport access CPE using a variety of different data communication protocols.

In accordance with an aspect of the present invention there is provided a method of operating a data communication apparatus including, at each of a plurality of service specific transceivers, receiving a plurality of input signals from a given plurality of data communications devices operating with a given data communication protocol, aggregating each of said received plurality of input signals to result in a given service specific electrical signal and transmitting said given service specific electrical signal to a wavelength access controller. The method further includes, at said wavelength access controller, receiving a plurality of service specific electrical signals from a plurality of service specific transceivers, at least two of said service specific transceivers operating with different data communication protocols, converting said plurality of service specific electrical signals to a corresponding plurality of service specific optical signals, wavelength division multiplexing said plurality of service specific optical signals to result in a wavelength division multiplexed signal and transmitting said wavelength division multiplexed signal over an optical conductor to an element of an optical transport network. In another aspect of the present invention, there is provided a data communication apparatus including service specific transceivers for carrying out transceiver specific steps of this method and a wavelength access controller for carrying out wavelength access specific steps of this method.

In accordance with another aspect of the present invention there is provided a computer readable medium for providing program control for a wavelength access controller in a wavelength access server, where said wavelength access server is communicatively coupled to both a plurality of service specific data communications devices and an element of an optical transport network, and said wavelength access controller is communicatively coupled to a plurality of service specific transceivers. The computer readable medium adapts the wavelength access controller to be operable to classify a service specific electrical signal from each of said plurality of service specific transceivers, maintain a database of information relating to resources in said optical transport network, receive a connection request, from one of said plurality of service specific transceivers, for a path through said transport network, determine, based on said information in said database, a path through said transport network corresponding to said connection request and signal said element of said optical transport network to set up said determined path through said transport network.

In accordance with a further aspect of the present invention there is provided a method of operating a data communication apparatus including, at a wavelength access controller, receiving a wavelength division multiplexed signal over an optical conductor from an element of an optical transport network, wavelength division de-multiplexing said wavelength division multiplexed signal to result in a plurality of service specific optical signals, converting said plurality of service specific optical signals to a corresponding plurality of service specific electrical signals, determining which of a plurality of service specific transceivers correspond to each of said plurality of service specific electrical signals and transmitting each of said plurality of service specific electrical signals to a determined corresponding service specific transceiver. The method also includes, at each of said plurality of service specific transceivers, receiving a given service specific electrical signal from said wavelength access controller, segmenting said given service specific electrical signal to result in a plurality of output signals and transmitting each of said plurality of output signals to a corresponding data communication device. In another aspect of the present invention, there is provided a data communication apparatus including a wavelength access controller for carrying out wavelength access specific steps of this method and a service specific transceiver for carrying out transceiver specific steps of this method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION OF THE PREFERRED EMBODIMENTS

Figure 1:
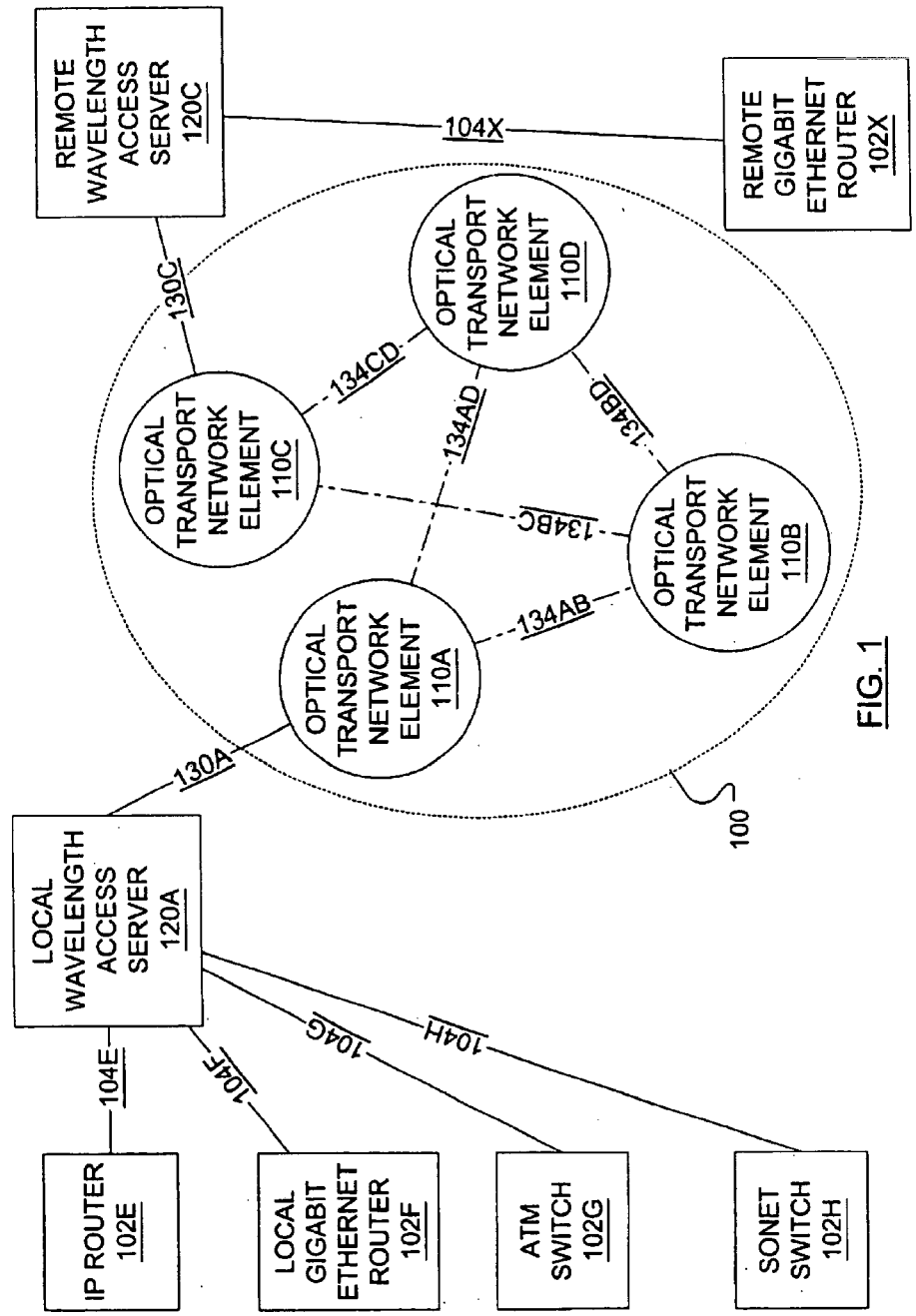
FIG. 1 is a schematic network of optical transport network elements representing a communications network.

FIG. 1 illustrates a network architecture suitable for use with the present invention. An exemplary optical transport network 100 is modeled as a graph of optical transport network elements 110 and DWDM links 134 between the optical transport network elements 110. A number of transport access CPEs (service network nodes) 102 are connected to a local wavelength access server 120A for setting up paths through optical transport network 100. Specifically, an IP router 102E, a local gigabit Ethernet router 102F, an ATM switch 102G and a SONET switch 102H connect to the local wavelength access server 120A over service specific links 104E, 104F, 104G and 104H respectively. The local wavelength access server 120A connects to the optical transport network 100 via DWDM link 130A. Further, a remote gigabit Ethernet router 102X is connected over an Ethernet link 104X to a remote wavelength access server 120C and subsequently over a DWDM link 130C to the optical transport network 100.

Each DWDM link 130, 134 can support a number of wavelength channels. Since, even within different service types (IP, Ethernet, ATM, SONET, etc.), there may be different service categories (for IP telephony, virtual private networks, etc.) with different quality of service (QoS) requirements (cost, delay, bandwidth, etc.), wavelength channels within optical transport network 100 may be configured to carry specific service categories.

Figure 2:
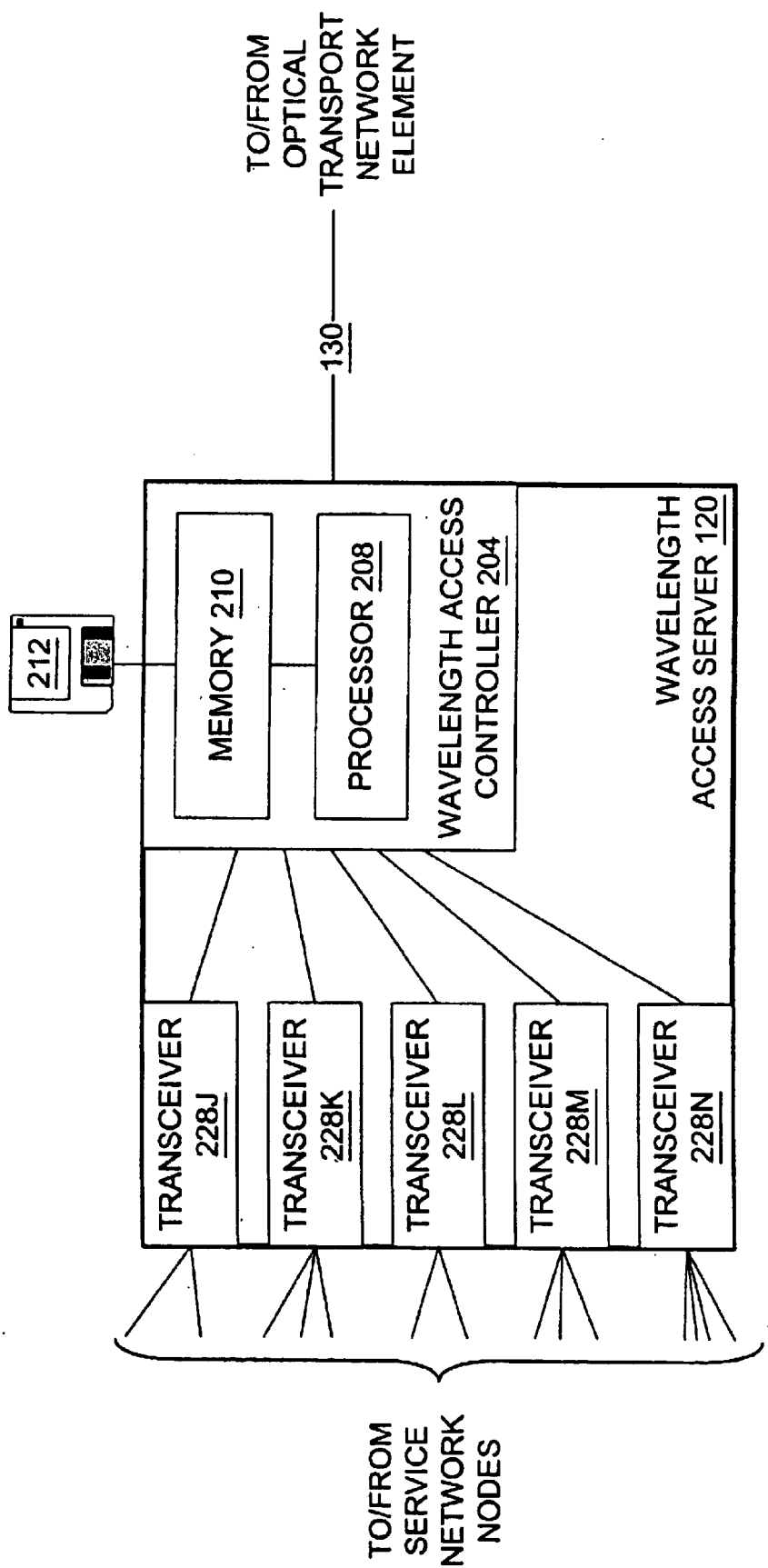
FIG. 2 illustrates a wavelength access server for use in connecting to the network of FIG. 1 in an embodiment of the present invention.

As shown in FIG. 2, the wavelength access server 120 comprises a wavelength access controller 204 in communication with a number of service specific transceivers 228J, 228K, 228L, 228M and 228N that send and receive data over service specific links to service network nodes 102 (not shown). The wavelength access controller 204 comprises a memory 210 and a processor 208 loaded with data communication apparatus operating software for executing the method of this invention from a software medium 212. The software medium 212 could be a disk, a tape, a chip or a random access memory containing a file downloaded from a remote source. The wavelength access controller 204 is also in bi-directional optical communication with the optical transport network element 110 (not shown) over a DWDM link 130.

Figure 3:
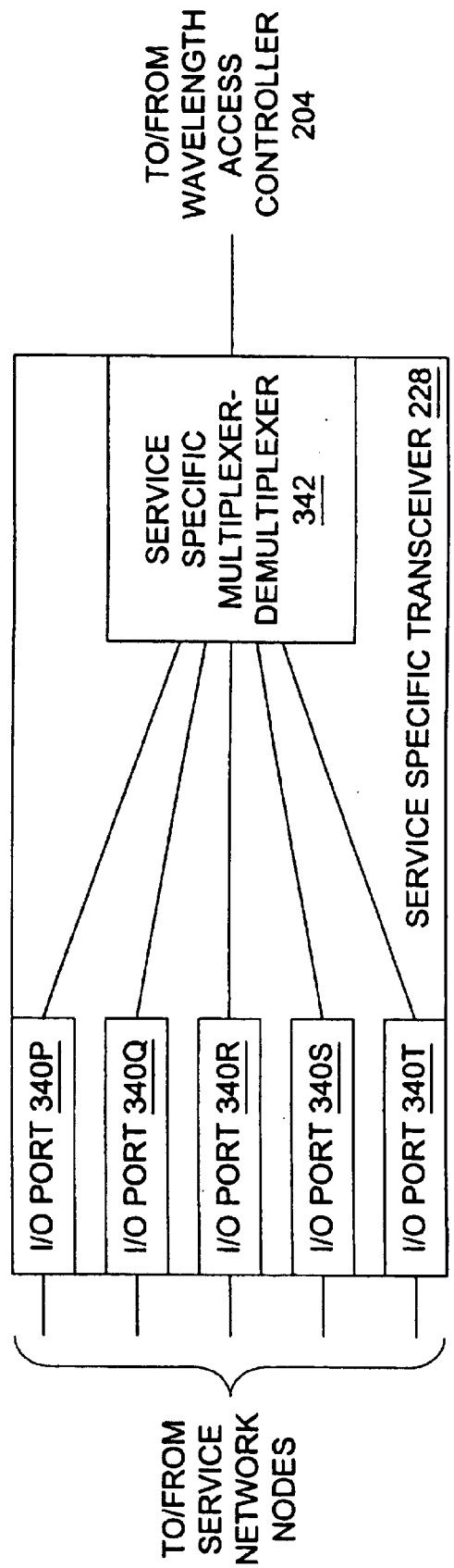
FIG. 3 illustrates a service specific transceiver for use in the wavelength access server of FIG. 2 in an embodiment of the present invention.

An exemplary configuration of a service specific transceiver 228 is shown in FIG. 3. The transceiver 228 communicates with service network nodes 102 (not shown) via input/output (I/O) ports 340P, 340Q, 340R, 340S and 340T. Each I/O port 340 is in turn in communication with a service specific multiplexer-demultiplexer 342 that is in bi-directional electrical communication with the wavelength access controller 204 (FIG. 2).

In operation, within the local wavelength access server 120A a connection request may be communicated from a service specific transceiver 228 to the wavelength access controller 204 to request a path, for an aggregated traffic stream, to a service network node associated with the remote wavelength access server 120C. At the wavelength access controller 204, an optimal path through the optical transport network 100 to the remote wavelength access server 120C is determined. Wavelength channels along the determined path may then be provisioned through communication between the wavelength access controller 204 and the optical transport network element 110A and further communication from the optical transport network element 110A to the rest of the optical transport network 100. At the remote wavelength access server 120C, the aggregated traffic stream from the local wavelength access server 120A must be segmented such that traffic, specific to the service network node associated with the remote wavelength access server 120C, may be appropriately directed.

Communication between the local wavelength access server 120A and the optical transport network element 110A may involve the passing of messages indicating the requirements of the requested path. Further, return messages may indicate, to the local wavelength access server 120A, the success or failure of an attempt, by the optical transport network element 110A, to fulfil the request. A "Set-up-connection" message for this use has been defined in U.S. patent application No. [attorney docket no. 91436-250] as part of a larger set of messages called the Optical Bandwidth Control Protocol, or OBCP. Such a Set-up-connection message may include such parameters as "Request-ID" to differentiate the request from other requests and "Service-type" to specify, for instance, IP traffic or ATM traffic. The Set-up-connection message may also include parameters to indicate various requirements of the connection request such as "Bandwidth", "Traffic-engineering-parameters" and "Protection-priority". Finally, a "Hop-list" parameter allows the wavelength access server 120 to specify the path it has determined through the optical transport network 100.

Similar to the communication between the local wavelength access server 120A and the optical transport network element 110A outlined above, the communication between the service specific transceivers 228 and the wavelength access controller 204 may involve the passing of messages such as those that indicate requirements of a path through the optical transport network 100. Such intra-wavelength access server communication may include an exchange of messages for interface configuration and cross-connect provisioning.

In general, to effectively provide wavelength paths through an optical transport network 100 to a plurality of nodes in service networks using different protocols, a wavelength access server is required to perform the following functions: service traffic adaptation; traffic aggregation and segmentation; traffic classifying; optical inter-working; and system management.

Service traffic adaptation relates to adapting a service specific signal received from a service network node 102 to a signal that may be processed within the wavelength access server 120 for transmitting over the optical transport network 100. Service specific signals may include ATM, SONET, Gigabit Ethernet, IP router, FDDI, ESCON. Service traffic adaptation is performed in the wavelength access server 120 by the service specific transceiver 228 and, if the service specific signal is in an optical format, may include optical to electrical conversion at the I/O port 340. Traffic aggregation and segmentation is performed within the service specific transceiver 228 at the service specific multiplexer-demultiplexer 342. In the case of IP, traffic aggregation may simply involve interleaving of packets from the various I/O ports 340. However, in the case of SONET, traffic aggregation involves established SONET multiplexing techniques. For instance, four OC-12 (SONET Optical Carrier 12) signals may be multiplexed into a single OC-48 signal using established SONET multiplexing techniques.

Traffic classifying, performed at the wavelength access controller 204, determines a class of traffic received from a particular service specific transceiver 228. As will be known to a person skilled in the art, traffic is typically classified through a range from "mission critical" to "best effort". The class of traffic received from a particular service specific transceiver 228 may be based on a pre-arranged correlation between the particular service specific transceiver 228 and the traffic class as maintained at the wavelength access server 120. The class of a particular aggregated stream of traffic has an effect on the level of protection requested for that aggregated traffic stream in the optical transport network 100.

The optical inter-working function is performed at the wavelength access controller 204. Essentially, optical inter-working relates to converting (or mapping) the service specific electrical signals into corresponding service specific optical for transmission over wavelength channels in a DWDM link. The optical inter-working function may include a capability to add a "digital wrapper" to each service specific optical signal. Such a digital wrapper can add per-wavelength performance monitoring and error correction features to the service specific optical signal. The digital wrapper may take the form of a header similar to that used in SONET. For an example suitable digital wrapper, consider transmission of a 10 Gigabit Ethernet signal as payload in an OC-192 SONET signal. WaveWrapper™ technology, as defined by Lucent Technologies, provides a second example.

The system management function is performed at the wavelength access controller 204 in conjunction with the traffic classifying function and the optical inter-working function. System management includes aspects such as signaling, connection management, resource co-ordination, protection prioritization and access policy management.

Signaling refers to the exchange of messages on the ink between the wavelength access server 120 and the optical transport network element 110. The message exchange relates primarily to aspects of system management hereinafter discussed.

The connection management aspect of system management relates to the communication between the wavelength access server 120 and the optical transport network element 110 to establish, reconfigure and dynamically provision wavelength channels forming paths through the optical transport network 100. The requesting of a specific path through the optical transport network 100 is made possible by the knowledge, at the wavelength access server 120, of the resources available in the optical transport network 100.

The aspect of system management called resource co-ordination relates to the maintenance of a database of the topology of the optical transport network 100, that includes such resource availability information. This database is kept current through the receipt, from each optical transport network element 110, of "Resource Link State Advertisements" as described in the afore referenced patent application.

When a path through the optical transport network 100 is established in response to a connection request, an alternate path to the same destination may also be established. These alternate paths provide an aspect of system management called "protection", in that, in case of a failure in a primary path, an alternate path may be activated. It may further be the case that two traffic streams are connected over two different paths through the optical transport network 100 to the same destination. Protection prioritization provides an aspect of system management through which a low priority traffic stream that is using a path to the same destination as that of a high priority traffic stream may lose access to the path so that the higher priority traffic stream may continue a connection after a failure in the primary path of the higher priority traffic stream.

Where a service provider provides access to the optical transport network 100, an agreement may be in place with customers of the service provider guaranteeing that the provided service have particular qualities, such as minimum bandwidth or maximum delay. "Access policy management" is the aspect of system management responsible for maintaining these qualities. A particular access policy may be associated with each service (and therefore with each service specific transceiver 228) according to configuration parameters maintained by the wavelength access controller 204.

By way of example, consider a wavelength access server 120 supporting ten 1-Gigabit Ethernet traffic streams (from the local gigabit Ethernet router 102F and nine other gigabit Ethernet routers) and four OC-48 traffic streams (from the SONET switch 102H and three other SONET switches). In this regard, note that OC-48 is an optical carrier (OC) level, used in SONET, that allows data transmission at 2488.32 Mbps (megabits per second). The "48" represents a multiple of a basic optical carrier rate, OC-1, that allows data transmission at 51.84 Mbps. At a first transceiver, say transceiver 228J, the ten 1-Gigabit Ethernet traffic streams may be aggregated into a single 10-Gigabit Ethernet traffic stream at an Ethernet specific multiplexer-demultiplexer that is part of transceiver 228J. The 10-Gigabit Ethernet traffic stream may then be electrically transmitted to the wavelength access controller 204. At a second transceiver, say transceiver 228K, the four OC-48 streams may be aggregated into a single OC-192 stream at a SONET specific multiplexer-demultiplexer that is part of transceiver 228K. The aggregated stream may then be electrically transmitted to the wavelength access controller 204.

At the wavelength access controller 204, the two aggregated traffic streams are classified and then allocated a wavelength in the DWDM link 130A to optical transport network element 110A. A path through the optical transport network 100 is determined by the wavelength access controller 204 on behalf of each aggregated traffic stream. If, for example, the destination for the Ethernet traffic is the remote gigabit Ethernet router 102X, the wavelength access controller 204 may determine that a path including DWDM links 134AB, 134BD and 134DC serves the requirements of the Ethernet traffic stream for bandwidth and delay. Another (most likely different) path is determined for the SONET traffic. The optical transport network element 110 is then instructed by the wavelength access controller 204, through the use of a protocol such as OBCP, to set up the path determined for the Ethernet traffic as well as a path (likely to have a different destination) for the SONET traffic. Once a response is received from the optical transport network element 110A indicating that the paths have established, transmission of the traffic may begin.

At the receiving end of the Ethernet traffic, the remote wavelength access server 120C receives a wavelength division multiplexed signal over the DWDM link 130C from the optical transport network element 110C. The wavelength division multiplexed signal is subsequently de-multiplexed and the resulting Ethernet specific optical signal is converted to an Ethernet specific electrical signal. A wavelength access controller determines an appropriate transceiver to pass the Ethernet specific electrical signal, perhaps through use of a digital wrapper as previously discussed. The Ethernet specific electrical signal is then transmitted to the appropriate transceiver. The Ethernet specific transceiver receives the Ethernet specific electrical signal and segments the 10-Gigabit Ethernet signal into its ten 1-Gigabit Ethernet components. The 1-Gigabits Ethernet signal whose destination is the gigabit Ethernet router 102X is then transmitted to the gigabit Ethernet router 102X.

As will be apparent to a person skilled in the art, the links (130 and 134) to, and within the optical transport network node 100 need not be DWDM, as any wavelength division multiplexing format would suffice.

Other modifications will be apparent to those skilled in the art and, therefore, the invention is defined in the claims.

We claim:
1. A method of operating a data communication apparatus comprising:
at each of a plurality of service specific transceivers;
receiving a plurality of input signals from a given plurality of data communications devices operating with a given data communication protocol;
aggregating each of said received plurality of input signals to result in a given service specific electrical signal;
transmitting said given service specific electrical signal to a wavelength access controller;
at said wavelength access controller;
classifying each of said plurality of service specific electrical signals;
receiving a plurality of service specific electrical signals from a plurality of service specific transceivers, at least two of said service specific transceivers operating with different data communication protocols;
converting said plurality of service specific electrical signals to a corresponding plurality of service specific optical signals;
wavelength division multiplexing said plurality of service specific optical signals to result in a wavelength division multiplexed signal; and
transmitting said wavelength division multiplexed signal over an optical conductor to an element of an optical transport network.

2. The method of claim 1 further comprising maintaining, at said wavelength access controller, a database of information relating to resources in said optical transport network.

3. The method of claim 2 wherein said resources comprise wavelength channels between elements in said optical transport network.

4. A method of operating a data communication apparatus comprising:
at each of a plurality of service specific transceivers:
receiving a plurality of inputs signals from a given plurality of data communications devices operating with a given data communication protocol;
aggregating each of said receiving plurality of input signals to result in a given service specific electrical signal;
transmitting said given service specific electrical signal to a wavelength access controller;
at said wavelength access controller:
receiving a plurality of service specific electrical signals from a plurality of service specific transceivers, at least two of said service specific transceivers operating with different data communication protocols;
converting said plurality of service specific electrical signals to a corresponding plurality of service specific optical signals;
wavelength division multiplexing said plurality of service specific optical signals to result in a wavelength division multiplexed signal;
transmitting said wavelength division multiplexed signal over an optical conductor to an element of an optical transport network;
maintaining a database of information relating to a wavelength channels between elements in said optical transport network;
receiving a connection request from one of said plurality of service specific transceivers;
determining, based on said information in said database, a path through said optical transport network corresponding to said connection request; and instructing said element of said optical transport network to set up said determined path through said optical transport network.

5. The method of claim 1 further comprising, before said converting, including header information in each of said plurality of service specific electrical signals.

6. Data communication apparatus, comprising:
a plurality of service specific transceivers, each transceiver of said plurality of service specific transceivers for:
receiving a plurality of input signals from a given plurality of data communications devices operating with a given data communication protocol;
aggregating each of said received plurality of input signals to result in a given service specific electrical signal;
transmitting said given service specific electrical signal to a wavelength access controller;
a wavelength access controller for:
classifying each of said plurality of service specific electrical signals;
receiving a plurality of service specific electrical signals from said plurality of service specific transceivers, at least two of said service specific transceivers operating with different data communication protocols;
converting said plurality of service specific electrical signals to a corresponding plurality of service specific optical signals;
wavelength division multiplexing said plurality of service specific optical signals to result in a wavelength division multiplexed signal; and
transmitting said wavelength division multiplexed signal over an optical conductor to an element of an optical transport network.

7. Data communication apparatus, comprising:
a plurality of service specific transceivers, each transceiver of said plurality of service specific transceivers comprising:
means for receiving a plurality of input signals from a given plurality of data communications devices operating with a given data communication protocol;
means for aggregating each of said received plurality of input signals to result in a given service specific electrical signal;
means for transmitting said given service specific electrical signal to a wavelength access controller;
a wavelength access controller comprising:
means for classifying each of said plurality of service specific electrical signals;
means for receiving a plurality of service specific electrical signals from said plurality of service specific transceivers, at least two of said service specific transceivers operating with different data communication protocols;
means for converting said plurality of service specific electrical signals to a corresponding plurality of service specific optical signals;
means for wavelength division multiplexing said plurality of service specific optical signals to result in a wavelength division multiplexed signal; and
means for transmitting said wavelength division multiplexed signal over an optical conductor to an element of an optical transport network.

8. A data communication apparatus comprising:
a plurality of service specific transceivers, each transceiver of said plurality of service specific transceivers adapted to:
receive a plurality of input signals from a given plurality of data communications devices operating with a given data communication protocol;
aggregate each of said received plurality of input signals to result in a given service specific electrical signal;
transmit said given service specific electrical signal to a wavelength access controller;
said wavelength access controller adapted to:
receive a plurality of service specific electrical signals from a plurality of service specific transceivers, at least two of said service specific transceivers operating with different data communication protocols;
convert said plurality of service specific electrical signals to a corresponding plurality of service specific optical signals;
wavelength division multiplex said plurality of service specific optical signals to result in a wavelength division multiplexed signal;
transmit said wavelength division multiplexed signal over an optical conductor to an element of an optical transport network;
maintain a database of information relating to wavelength channels between elements in said optical transport network;
receive a connection request from one of said plurality of service specific transceivers;
determine, based on said information in said database, a path through said optical transport network corresponding to said connection request; and
instruct said element of said optical transport network to set up said determined path through said optical transport network.

* * * * *